Jan. 17, 1928.  1,656,175
F. DE BENEDETTI
MOTOR CAR
Filed Feb. 14, 1925   2 Sheets-Sheet 1

Inventor
F. De Benedetti
by
Laugnier, Parry, Card & Laugnier
Atty's.

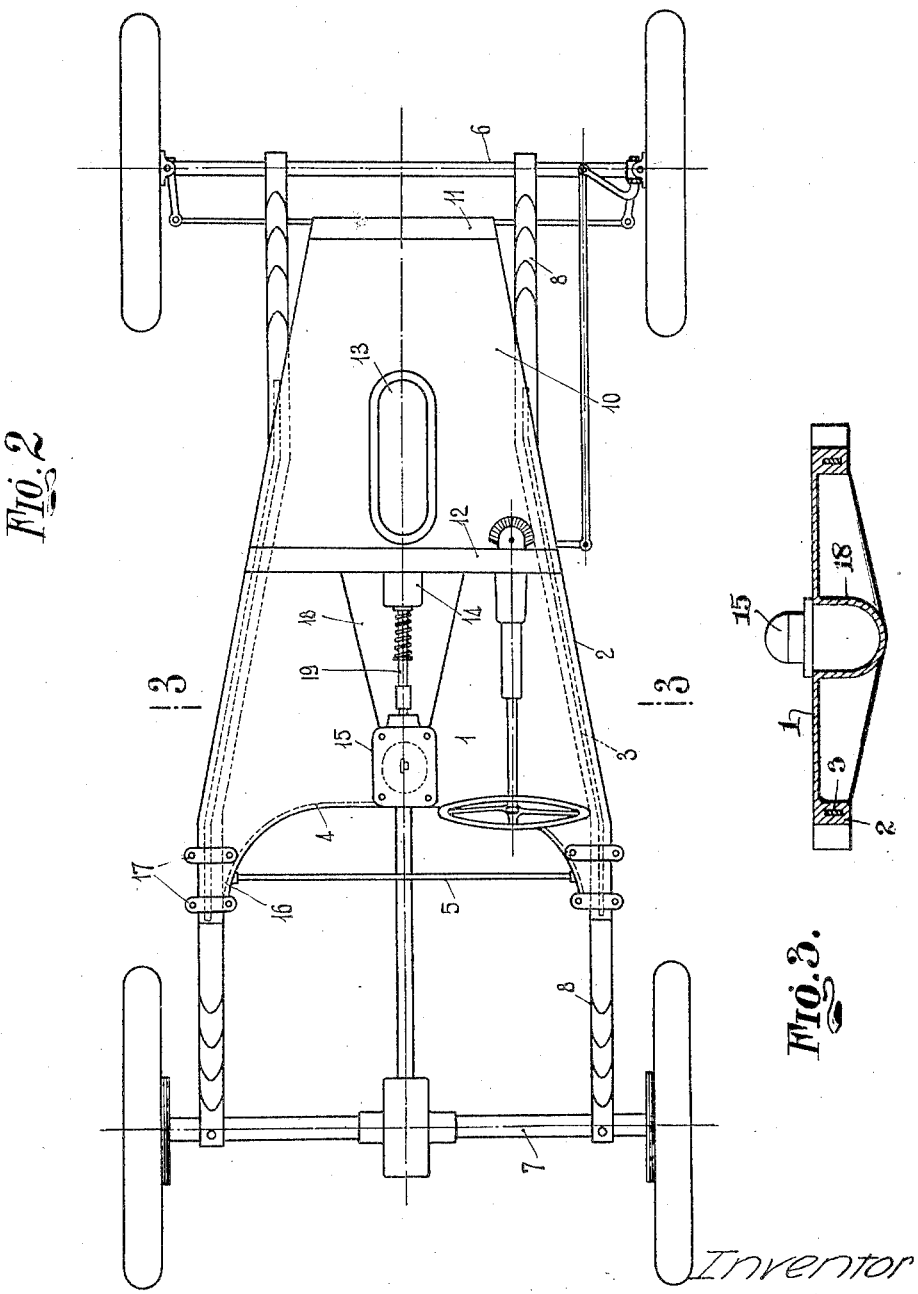

Patented Jan. 17, 1928.

1,656,175

UNITED STATES PATENT OFFICE.

FRANCESCO DE BENEDETTI, OF TURIN, ITALY.

MOTOR CAR.

Application filed February 14, 1925, Serial No. 9,158, and in Italy February 15, 1924.

The present invention relates to motor cars and has for its object a motor car of light type in which the frame or structure consists of a plate cast from aluminium or light alloy and having side steel reinforcements at the ends of which are fastened cantilever springs for wheeled axles.

On the annexed drawing is shown by way of example an embodiment of the present invention and Figure 1 is a diagrammatic side view of a car frame according to the present invention provided with wheels and essential parts and devices of the car shown by their outline;

Figure 2 is a plan view of the same and

Figure 3 is a transverse section of the frame on line 3—3 of Figure 2.

Figure 1:
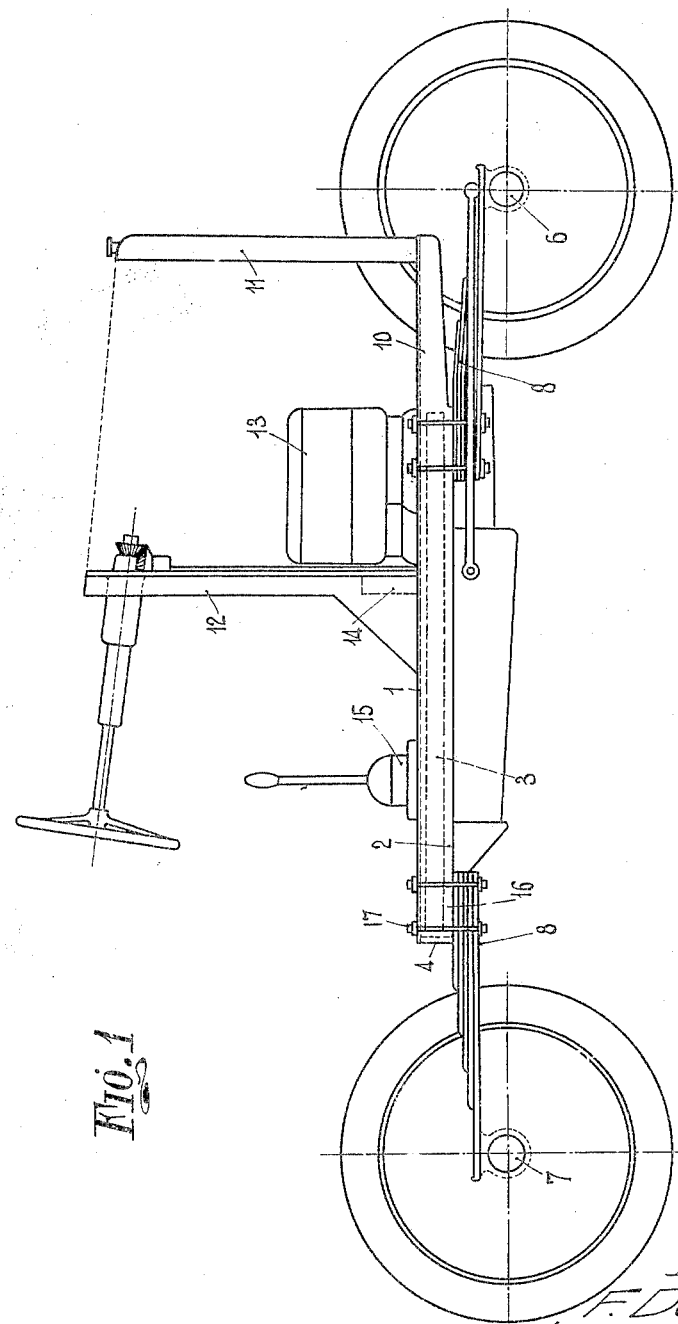

As shown on said figures, the car frame consists of a plate 1 which is cast from aluminium or aluminium alloy; said plate has along its side edges two large depending stiffening ribs 2 in each of which is embedded a steel rod 3 at the time of casting. Along the rear edge of said plate is provided a depending reinforcing rib 4 and the said plate may be recessed to provide extending lugs 16 which are interconnected by a transverse brace 5.

The front and rear axles 6 and 7 respectively are connected with the said frame, consisting of the plate 1 with reinforcing rods 3, by means of blade springs 8 each of which has its root portion fastened on said plate by means of straps 17 encircling said reinforced ribs 2.

At its front end said plate 1 extends beyond the ends of the ribs 2 and rods 3 to provide a flat extension 10 on which is located the engine radiator 11.

On said plate frame 1 are fastened the dash board 12 and the engine and other mechanisms which are not described in detail as they are not essential for the purposes of the present invention.

In the embodiment illustrated the engine 13 is arranged between the front ends of the rods 3 and behind it are arranged the clutch 14 and the change speed gear 15, said plate providing a depressed or channel portion 18 for providing a space for the shaft 19; of course the arrangement and location of parts on the frame provided by the plate 1 and extension 10 may also be different with respect to that illustrated.

In any case the plate 1 provides the foot board of the car and it is made of aluminium or of a light metal or alloy.

The said frame may thus be made very light while the steel reinforcements 3 of its side ribs 2 ensure the required stiffness for supporting the wheel axles.

What I claim as my invention and desire to secure by United States Letters Patent is:—

1. In a motor car, a frame comprising a cast plate, a longitudinal reinforcement at each side edge of said plate, and blade springs each connected by its base with one of said side reinforcements, said springs bearing a wheeled axle at their free ends.

2. In a motor car, a frame comprising a plate cast from a light metal, a longitudinal steel reinforcement embedded in said plate at each side edge of the same, and blade springs each connected by its base with one of said side reinforcements, said springs bearing a wheeled axle at their free ends.

3. In a motor car, a frame comprising a plate cast from a light metal, stiffening ribs along the longitudinal edges of said plate, reinforcing rods in said ribs, and blade springs each connected by its base with one end of said reinforcing ribs and rods, the free ends of said springs being connected with the wheeled axles of the car.

4. In a motor car, a frame comprising a cast plate, a longitudinal reinforcement at each side edge of said plate, blade springs each connected by its base with one of said side reinforcements, said springs bearing a wheeled axle at their free ends, and a front extension in said plate projecting beyond the points where the adjacent front springs are fastened to said plate.

In testimony whereof I have signed my name to this specification.

FRANCESCO DE BENEDETTI.